(12) United States Patent
Fuller et al.

(10) Patent No.: US 7,574,807 B1
(45) Date of Patent: Aug. 18, 2009

(54) INTERNAL PIPE CUTTER

(75) Inventors: Frank Fuller, Phoenix, AZ (US); Howard A. Tuttle, Peoria, AZ (US)

(73) Assignee: HoLeLocking Enterprises LLC, Phx, AZ (US)

( * ) Notice: Subject to any disclaimer, the term of this patent is extended or adjusted under 35 U.S.C. 154(b) by 301 days.

(21) Appl. No.: 11/788,619

(22) Filed: Apr. 19, 2007

(51) Int. Cl.
B23D 45/16 (2006.01)
B23D 21/10 (2006.01)
B23D 21/14 (2006.01)

(52) U.S. Cl. .............................. 30/388; 30/103; 166/298
(58) Field of Classification Search .................. 30/388, 30/92, 103, 104, 105, 106, 107; 166/55.1, 166/298; 83/186, 187; 82/1.2, 82
See application file for complete search history.

(56) References Cited

U.S. PATENT DOCUMENTS

| | | | |
|---|---|---|---|
| 622,681 A | | 4/1899 | Nervey |
| 1,100,760 A | * | 6/1914 | Morelli ........................ 30/105 |
| 2,700,818 A | | 2/1955 | Fisher |
| 2,731,718 A | | 1/1956 | Goss |
| 2,915,819 A | * | 12/1959 | O'Day et al. ................. 30/103 |
| 2,942,092 A | * | 6/1960 | Cammann .................. 219/69.2 |
| 3,196,722 A | * | 7/1965 | Lewis et al. ................... 83/887 |
| 3,243,879 A | * | 4/1966 | Gill et al. ....................... 30/103 |
| 3,717,056 A | * | 2/1973 | Gracin et al. ................... 82/82 |
| 3,783,721 A | | 1/1974 | Miller |
| 3,911,574 A | * | 10/1975 | Jones ............................ 30/105 |
| 3,939,561 A | * | 2/1976 | Nichols ........................ 30/107 |
| 3,977,076 A | | 8/1976 | Vieira |
| 3,999,292 A | * | 12/1976 | Breese ........................... 30/105 |
| 4,177,558 A | * | 12/1979 | Brown .......................... 30/103 |
| 4,177,559 A | * | 12/1979 | Anderson ..................... 30/105 |
| 4,307,512 A | * | 12/1981 | Phillips ......................... 30/94 |
| 4,369,573 A | * | 1/1983 | Vitale ........................... 30/105 |
| D273,194 S | * | 3/1984 | House ........................ D15/139 |
| 4,524,511 A | * | 6/1985 | Montiero ...................... 30/108 |
| 4,576,070 A | * | 3/1986 | Fitzgerald ........................ 82/82 |
| 4,809,775 A | * | 3/1989 | Fortin .......................... 166/55.7 |
| 4,932,125 A | * | 6/1990 | Poveromo ..................... 30/103 |
| 5,499,453 A | * | 3/1996 | Brauchitsch .................. 30/105 |
| 5,687,806 A | * | 11/1997 | Sallwasser et al. ............. 175/62 |
| D400,075 S | * | 10/1998 | Martelle ....................... D8/70 |

(Continued)

FOREIGN PATENT DOCUMENTS

JP 57066231 A * 4/1982

*Primary Examiner*—Kenneth E. Peterson
*Assistant Examiner*—Sean Michalski

(57) ABSTRACT

A pipe cutter is designed for cutting a pipe from the inside by insertion of the pipe cutter through an open end of the pipe. The pipe cutter includes an elongated hollow sleeve with first and second ends in which an elongated shaft which is longer than the hollow sleeve is located for rotation. One end of the elongated shaft is adapted for connection to a source of rotational power; and the lower or opposite end of the elongated shaft is attached to a rotary saw blade. A centering housing is located between the first and second ends of the hollow sleeve and includes a mechanism for moving the sleeve and the elongated shaft located in it from an initial position with the saw blade out of contact with the interior of the pipe to a position radially outward from the central axis of the pipe to engage and cut the pipe through a circular or orbital motion of the pipe cutter.

19 Claims, 11 Drawing Sheets

U.S. PATENT DOCUMENTS

| | | | |
|---|---|---|---|
| 5,815,926 A * | 10/1998 | Ekern | 30/103 |
| 6,167,968 B1 * | 1/2001 | Allarie et al. | 166/298 |
| 6,173,773 B1 * | 1/2001 | Almaguer et al. | 166/255.2 |
| 6,631,532 B2 * | 10/2003 | Seehusen | 15/104.012 |
| 6,915,853 B2 * | 7/2005 | Bakke et al. | 166/298 |
| 7,373,994 B2 * | 5/2008 | Tchakarov et al. | 175/58 |
| 7,380,599 B2 * | 6/2008 | Fields et al. | 166/264 |
| 2003/0221527 A1 * | 12/2003 | Lee | 83/184 |

* cited by examiner

INTERNAL PIPE CUTTER

BACKGROUND

The field of the present invention relates to a tool for cutting the wall of a pipe from inside the pipe with insertion of the tool through an opening at one end of the pipe.

In the building construction industry, vertically extending pipes are used for connection to water supplies, sewer lines and the like, in regions where roadways and feeder lines to houses or industrial buildings under construction are provided. In addition, it is a common practice in the building industry for plumbers to install large diameter waste pipes and the like before the finished flooring has been installed. Such pipes may extend above the surface of the finished roadway or flooring, and subsequently must be cut to a selected length, either at the roadway or flooring surface or below that surface, for subsequent connection to other components in the construction process.

A variety of tools have been designed for the purpose of effecting the internal cutting of various types of pipe. In their simplest forms, such tools include an elongated shaft with a rotary saw blade on the end of it. The other end of the shaft then may be attached to a hand drill or the like. The saw blade is inserted into the pipe and is circularly rotated about the interior of the pipe until the pipe is cut off at the desired length. Variations of this technique have been provided by placing a circular plate at a desired distance above the saw blade on the shaft; so that the plate abuts the end of the pipe and determines the depth of the cut, while the entire apparatus is rotated or orbitally moved about the pipe end to allow the saw blade to cut through the pipe.

It is desirable to provide an improved internal pipe cutter for cutting pipes at a desired depth from the open end thereof in a simple and effective manner.

DETAILED DESCRIPTION

Figure 1:
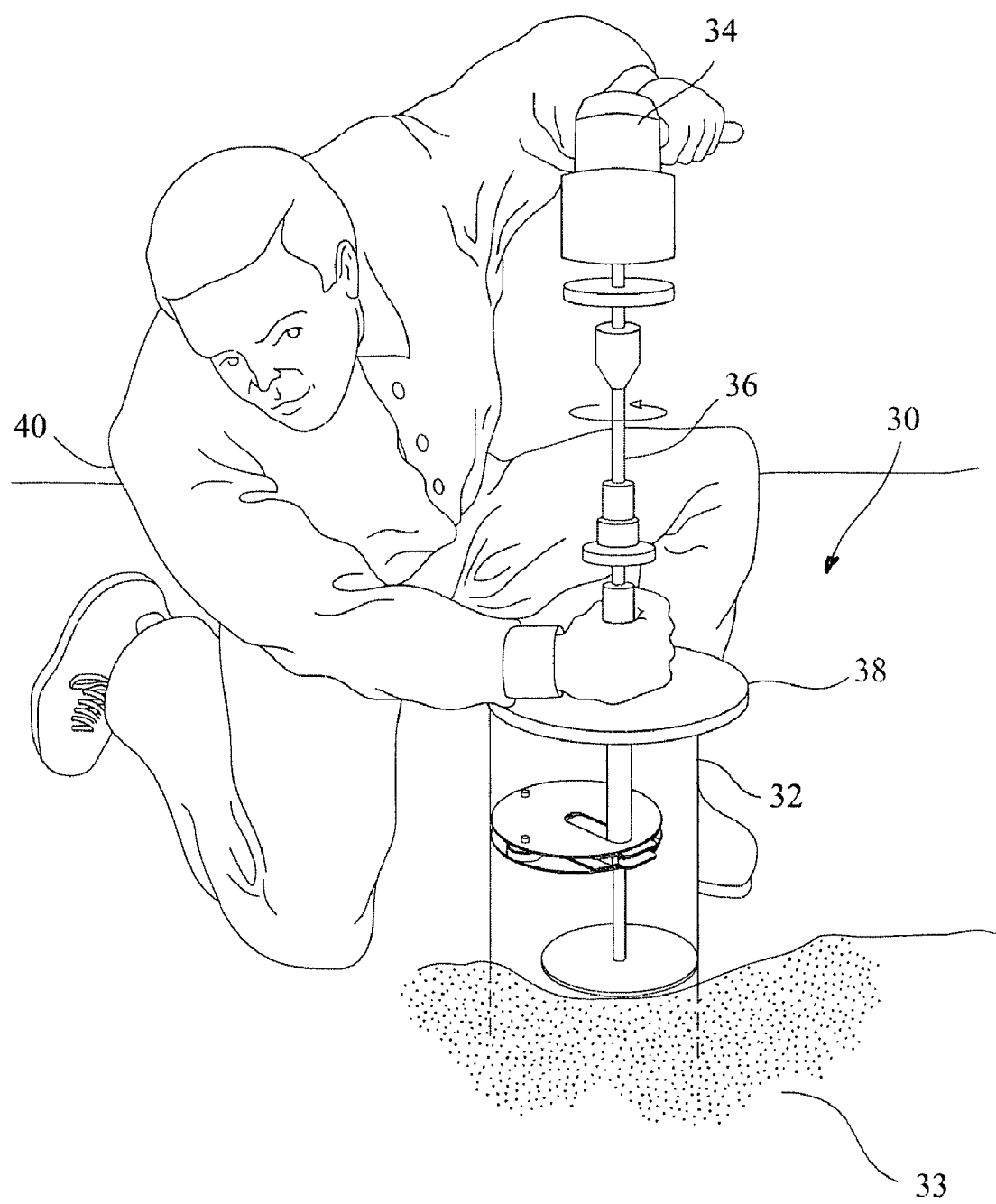
FIG. 1 is a diagrammatic representation of an operator using a pipe cutting tool according to an embodiment of the invention.
Figure 2:
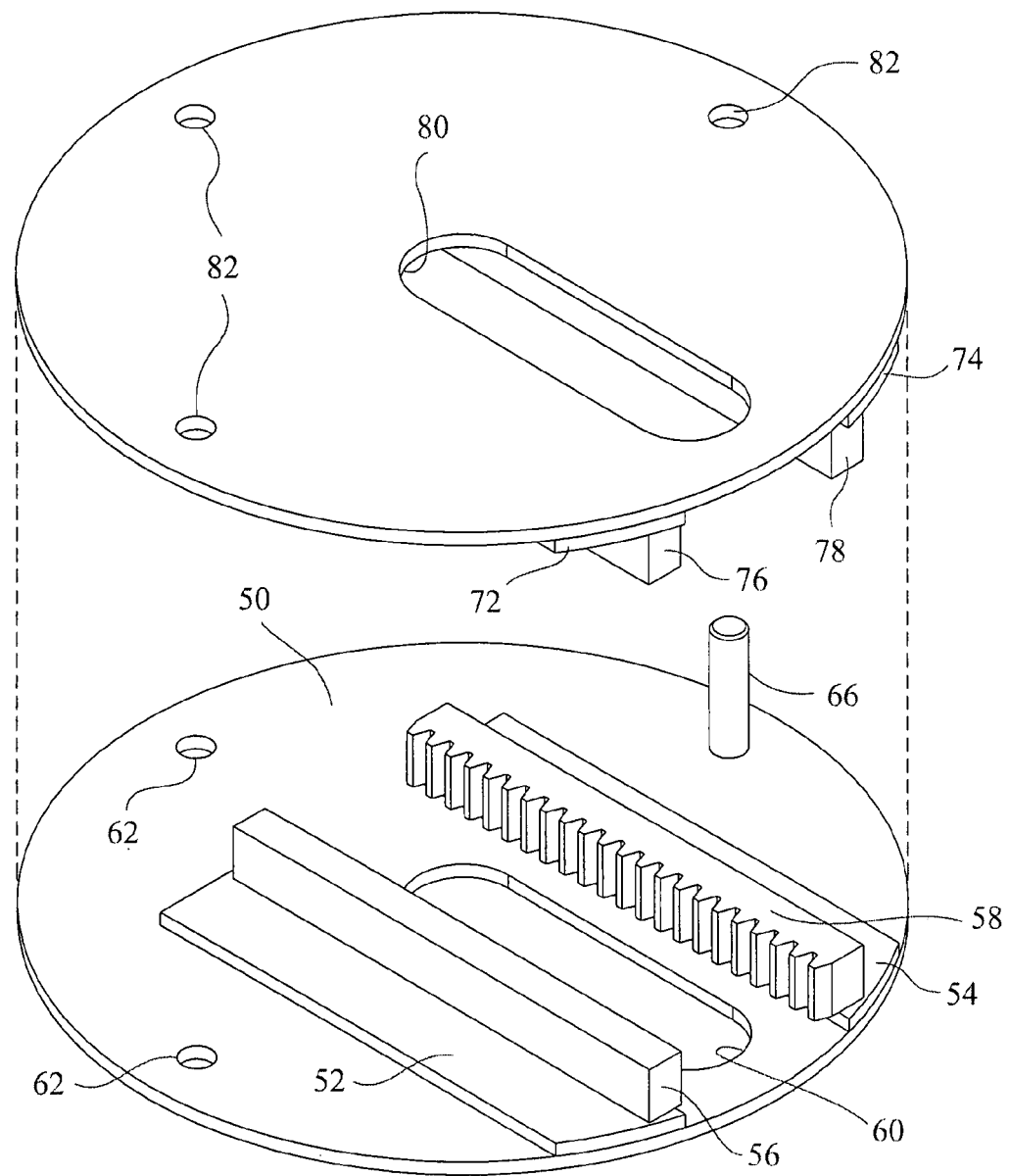
FIG. 2 is an exploded view of parts of an assembly of an embodiment of the invention.

Reference now should be made to the drawings. In FIG. 1, an operator 40 is shown in conjunction with the operation of an embodiment of an internal pipe cutter 30, which has been inserted into a pipe 32 extending above the surface of the ground 33. The portions of the internal pipe cutter shown in FIG. 1 include a hollow sleeve, through which an elongated rotating shaft 36 extends. The shaft 36 is driven by a source of rotational power, such as an air driven or electric driven drill 34. A guide flange 38, which has a diameter greater than the diameter of the pipe 32, is attached to the sleeve for limited rotation with the sleeve to effect cutting of the pipe 32 in a manner explained more fully subsequently. The guide flange 38 establishes the depth of the cut, as is more fully explained subsequently.

Reference now should be made to FIGS. 2 through 6, which disclose the various features of a centering housing used in the embodiment of the invention disclosed. This centering housing includes bottom and top plates 50 and 70, respectively, in the form of circular discs which have a diameter selected to be slightly less than the interior diameter of a pipe to be cut by the pipe cutter of the disclosed embodiment. The bottom and top plates 50 and 70 have elongated slots 60 and 80, respectively, extending substantially from the center of each of these plates radially outwardly toward the outer circumference or edge of each of the plates 50 and 70.

On opposite sides of the slots, a pair of spacers 52 and 54 for the plate 50, and 72 and 74 for the plate 70, are located parallel to and adjacent the respective slot 60 and 80. The plates 52, 54, 72 and 74 serve as guide plates for upper and lower slide plates 94 and 90 (shown most clearly in FIGS. 4 and 5). The channels for the slide plates 90 and 94 are formed on the lower circular housing plate 50 by a bar 56 on one side and a ratchet gear 58 on the other side, which extend inwardly toward the slot 60, as shown most clearly in FIG. 3, to form a guide channel beneath them and between the facing edges of the plates 52 and 54. Similarly, on the top circular plate 70 of the housing, a pair of elongated bars 76 and 78 are mounted on the guide plates 72 and 74 to form channels beneath their edges and the facing edges of the plates 72 and 74, as shown most clearly in FIGS. 3 and 6.

Figure 3:
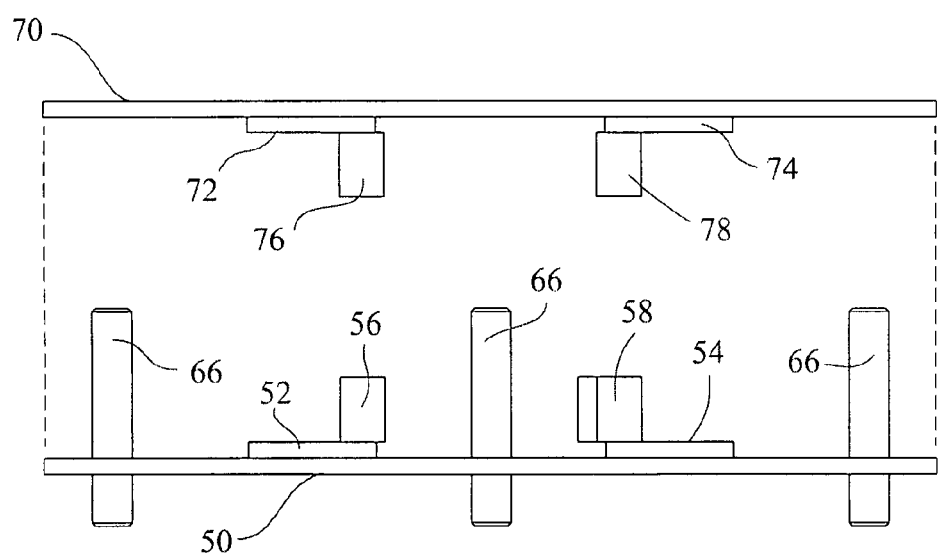
FIG. 3 is a side view of the embodiment shown in FIG. 2.
Figure 4:
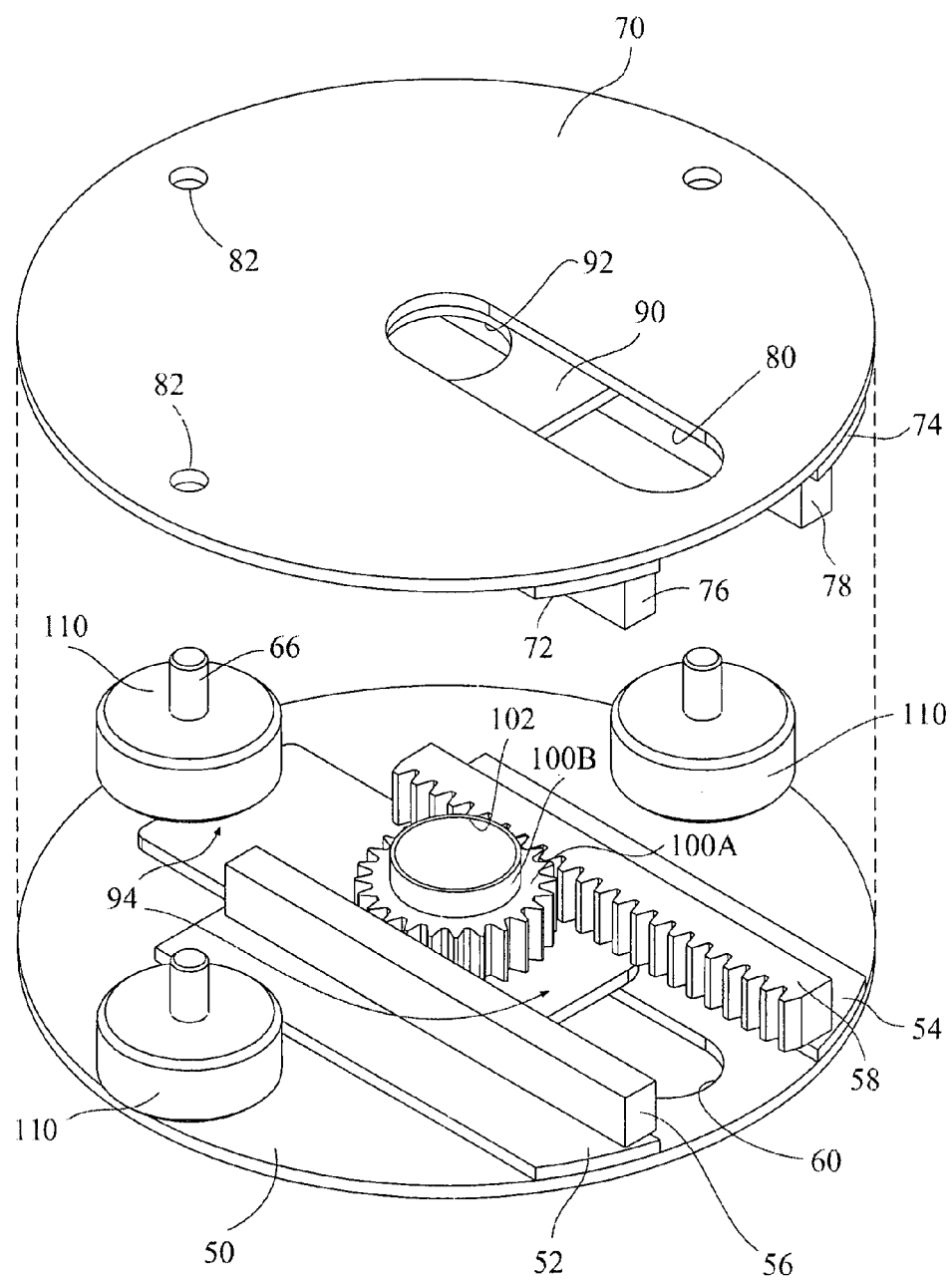
FIG. 4 is an exploded view of the embodiment shown in FIGS. 1 and 2 with additional parts illustrated.
Figure 6:
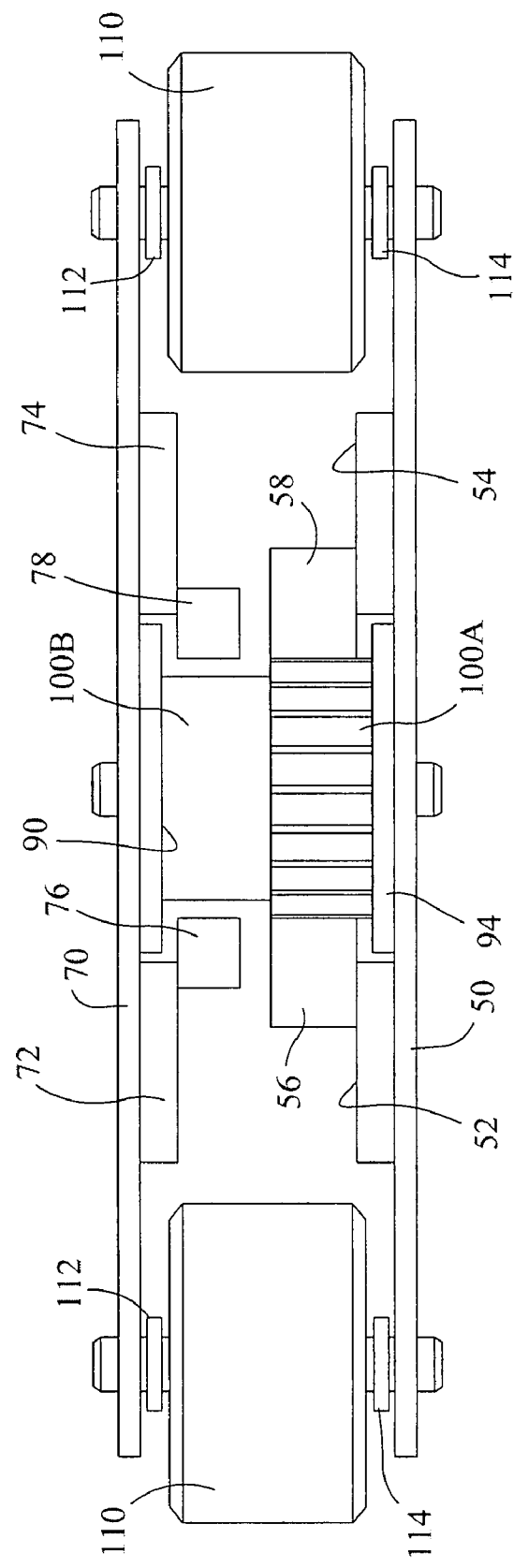
FIG. 6 is a side view of the embodiment shown in FIG. 5.

The bottom and top plates 50 and 70 of the housing are held together and spaced from one another by means of three vertical posts 66, which are extended between mounting holes 62 on the bottom plate 50 and 82 on the top plate 70, as illustrated in FIGS. 3, 4 and 6.

Spacer wheels 110 are rotatably mounted on each of the posts 66, and the outer edges of the wheels 110 extend slightly beyond the outer edges of the circumferences of the top and bottom plates 70 and 50 of the housing. Washers 112 and 114 (shown most clearly in FIG. 6) space the wheels 110 a slight distance above the bottom plate 50 of the housing and a slight distance below the top plate 70 of the housing, as shown most clearly in FIG. 6.

Figure 5:
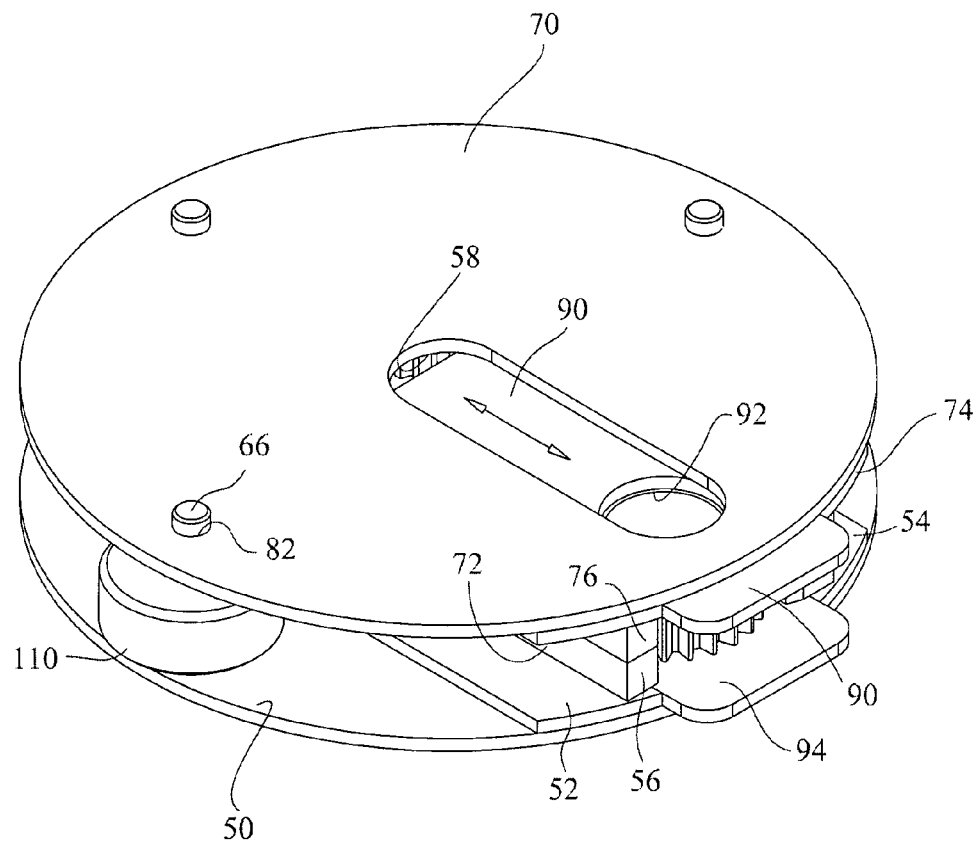
FIG. 5 is an assembled view of the embodiment shown in FIG. 4.

The housing assembly is completed by a pair of slide plates 90 and 94 (mentioned previously), which are free to move reciprocally in a radial direction, as shown by the arrows in FIG. 5, back-and-forth in the channels formed by the guide plates 52, 54, 72, 74, the spacer bars 56, 76, 78, and the rack gear 58, as described previously. The spacing provided by the washers 112 and 114 is sufficient to allow the guide plates 90 and 94 to pass beneath the wheel 110 and over the wheel 110, which is located diametrically opposite the slots 60 and 80.

The slide plates 90 and 94 each have a circular opening in them in the position shown for the opening 92 in the slide plate 90 in FIG. 5. The circular opening in the plate 94 is not shown; but it is aligned with and is of the same size as the opening 92 in the top slide plate 90.

FIGS. 7 through 11 should now be considered in conjunction with FIGS. 4, 5 and 6 for additional details of the disclosed embodiment. An elongated hollow sleeve 140 is employed for supporting the centering housing, described above, and having the bottom plate 50 and top plate 70 defining its vertical thickness in conjunction with the spacers 66 and the washers 112 and 114 for the wheels 110. This outer elongated hollow sleeve 140 has its lower end terminating in or extending slightly beyond a spur gear 100A having an upward extending shoulder 100B, as shown most clearly in FIGS. 4, 6, and 7. The spur gear 100A/100B is braised onto, welded onto, or otherwise securely attached to the hollow sleeve 140; so that the sleeve 140 and the spur gear 100A/100B rotate together.

The outer sleeve 140 then carries a rotatable elongated drive shaft 146, which has a length greater than the length of the hollow sleeve 140. The shaft 146 may be journaled at the upper and lower ends of the sleeve 140 and at intermediate points, if necessary, by means of suitable bearings (not shown). Consequently, the shaft 146 is capable of free rotation within the sleeve 140 when the upper end of the shaft 146 (as depicted in FIGS. 7 through 11 and FIG. 1) is attached to a source of rotational power, such as the motor driven unit 34 depicted diagrammatically in FIG. 1.

Figure 7:
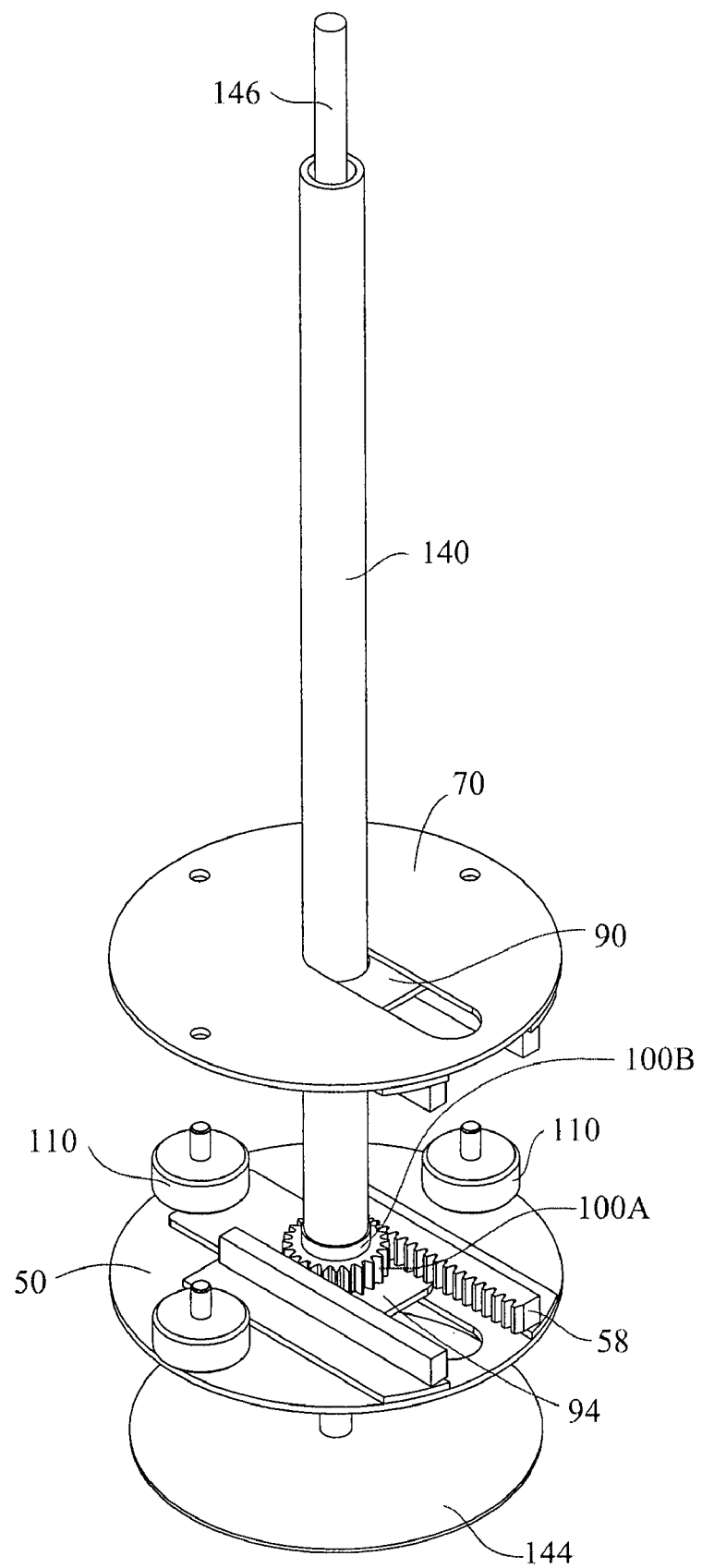
FIG. 7 is an overall partially exploded top perspective view of the embodiment of FIGS. 1 through 6.
Figure 8:
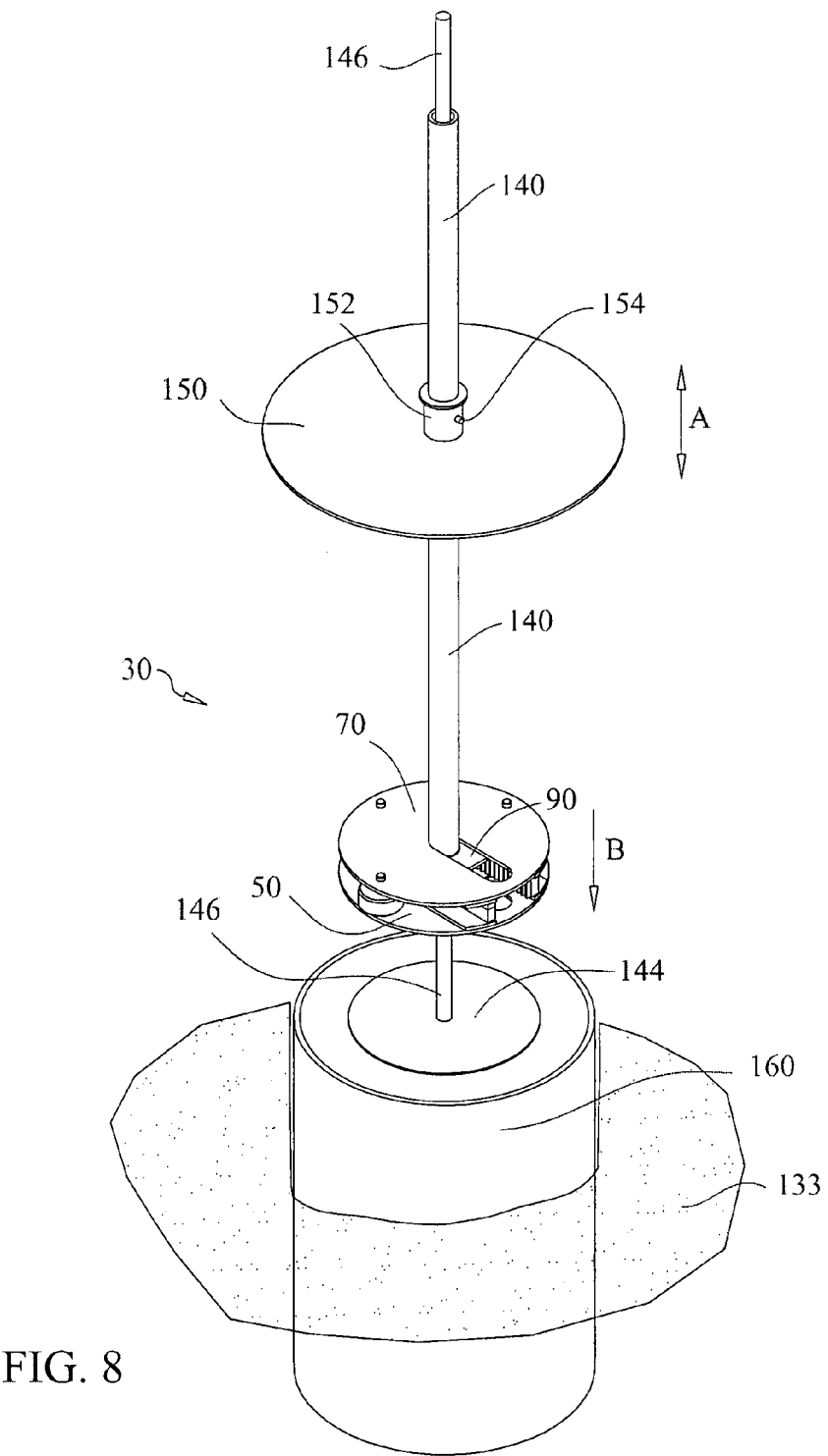
FIG. 8 is a top perspective view of the embodiment of FIGS. 1 to 7 showing its manner of use.
Figure 9:
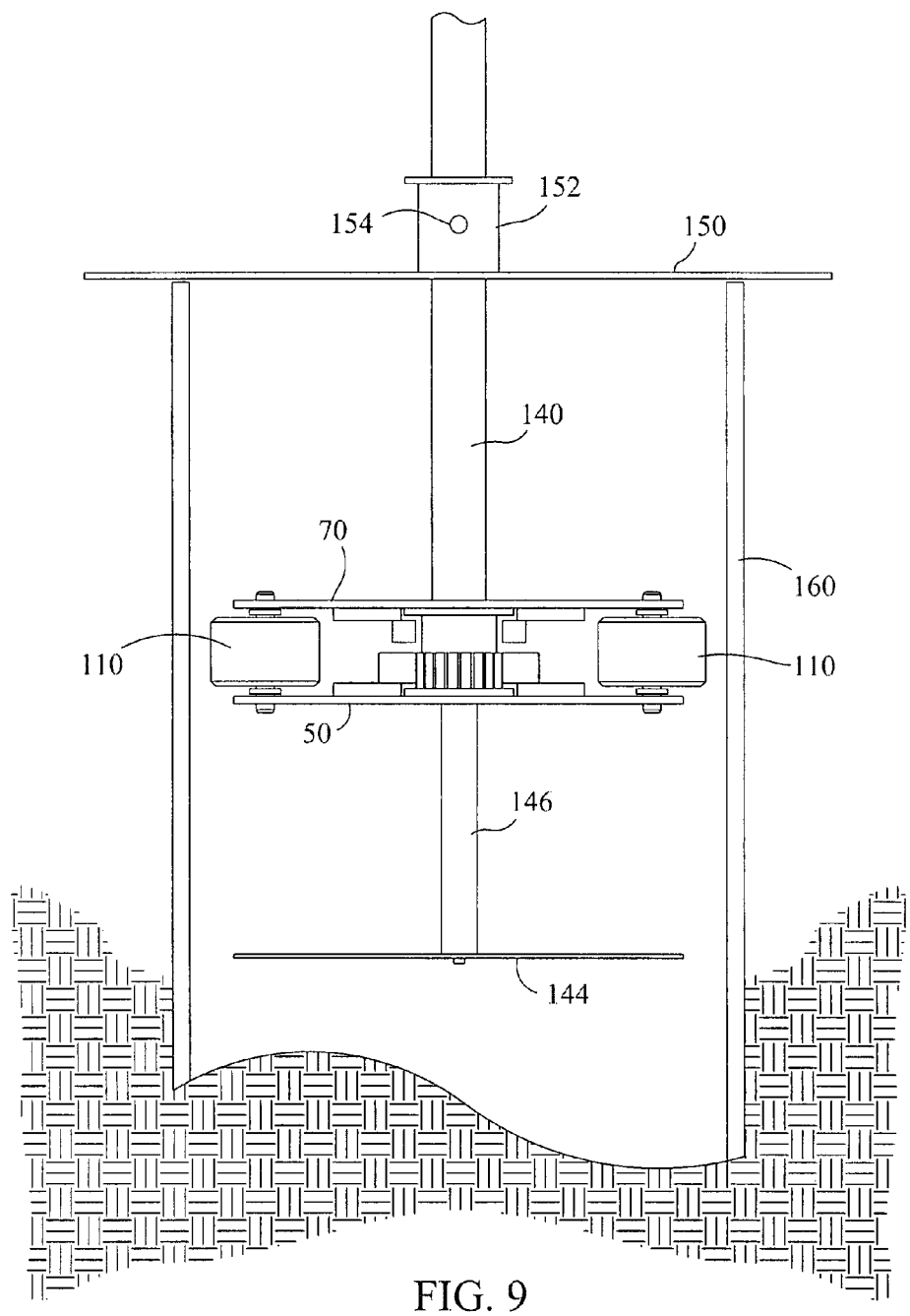
FIG. 9 is a side view of the embodiment shown in FIGS. 1 through 8 in a position of use.
Figure 10:
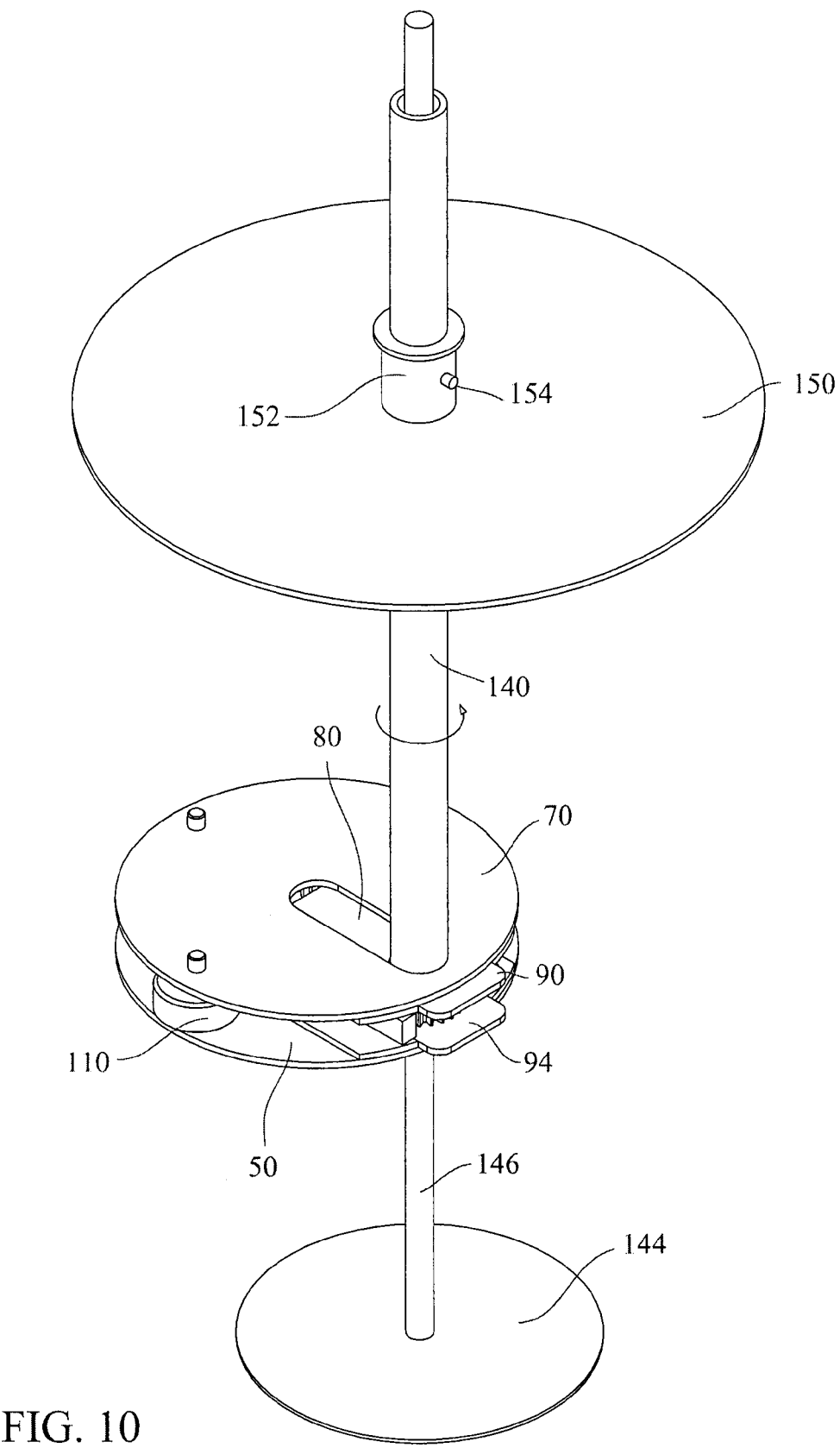
FIG. 10 is a top perspective view of the embodiment of FIGS. 1 through 9 illustrating an operative feature thereof.
Figure 11:
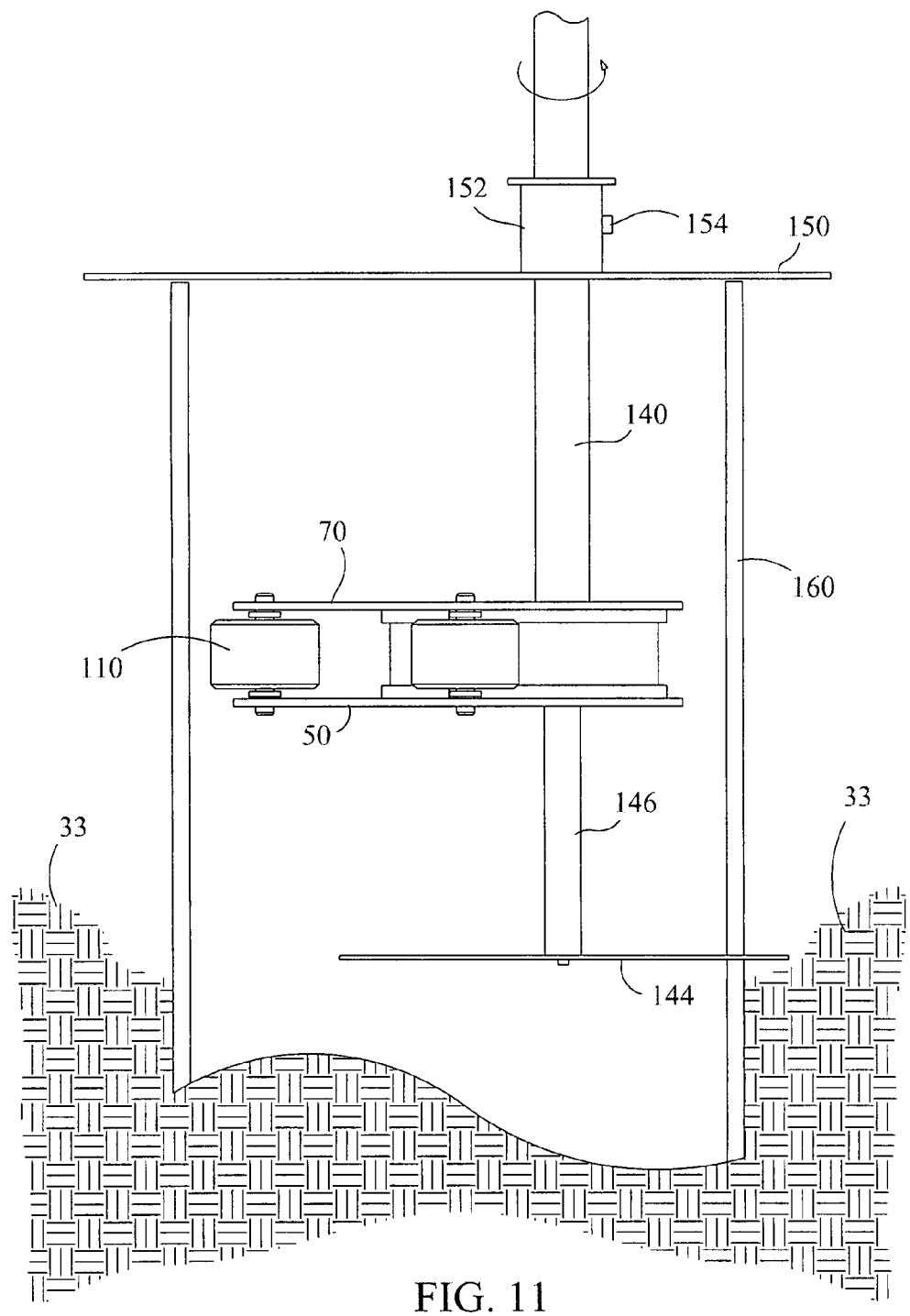
FIG. 11 is a side view of the embodiment of FIGS. 1 through 10 showing its manner of use.

As shown most clearly in FIGS. 7,9 and 11, the lower end of the rotatable shaft 146 has a rotary saw blade 144 attached to it by any suitable means, such as a bolt or the like. As is apparent from an examination of FIGS. 7 through 11, the saw blade 144 extends a short distance below the bottom plate 50 of the centering housing.

As is apparent from FIGS. 4 and 7 in particular, when the sleeve 140 is rotated counterclockwise (as viewed from the top), the spur gear 100A/100B also rotates with the sleeve 140 to which it is attached. This causes the relative position of the sleeve 140, with respect to the plates 50 and 70, to move from the generally centered location depicted in FIGS. 4 and 7, to an offset location depicted in FIG. 10. The length of the slots 60 and 80 in the plates 50 and 70, respectively, determines the maximum displacement which can take place, as shown in FIG. 10. When the sleeve 140 is rotated in a clockwise direction (as viewed from the top in FIGS. 7 through 11), movement of the sleeve 140, relative to the plates 50 and 70, is in the opposite direction toward the center to the position shown in FIG. 7, which depicts the maximum movement in this direction for the relative displacements of the centering housing and the outer sleeve 140.

The structure of the saw embodiment which is disclosed in the drawings is completed by the inclusion of a vertically adjustable guide flange 150, which is slidably mounted on the hollow sleeve 140 for movement up and down on the sleeve, as shown by the double-ended arrow A in FIG. 8. The outer diameter of the guide flange 150 is selected to be greater than the outer diameter of the pipe 160 (FIG. 8) with which the internal pipe cutter is to be used. The vertical adjustment of the flange 150 on the outer sleeve 140 is selected to cause the position of the saw blade 144 (FIG. 9) to be at the desired level for effecting the cut. Once the distance between the blade 144 and the underside of the guide flange 150 for the desired depth of cut has been determined, the guide flange 150 is secured by means of a set screw 154 through a shoulder 152 attached to the guide flange 150 to releasably hold the guide flange in place on the sleeve 140 to cause the saw blade 144 to be at the desired depth.

Once the apparatus has been inserted into a pipe 160 as shown in FIG. 9, the relative position of the various parts are as indicated. The source of power for the rotational drive shaft 140 is engaged to spin the saw blade 144. Then the outer sleeve 140 is rotated counterclockwise (as described previously) to move the saw blade 144 from the relatively centered position in FIG. 9 to the offset positions shown in FIGS. 10 and 11. Once the saw blade 144 engages the interior diameter of the pipe 160, the force between the saw blade 144 and the housing 50/70 through the spur gear 100A and ratchet gear 58 (100A/100B) tends to force the centering housing 50/70 in the opposite direction against the inside of the pipe where the wheels 110 engage the pipe interior. Once the saw blade 144 has been moved radially outwardly to a position where it cuts through the pipe 160, the entire assembly is orbitally or circularly rotated to allow the blade 144 to complete a circular cut in the pipe 160.

The centering housing 50/70 and its internal components allow a cut by the blade 144 to be perpendicular to the central axis of the pipe 160 and the central axis of the hollow sleeve 140, as is readily apparent from an examination of FIG. 11, for example.

Once the cut has been completed, the outer sleeve 140 is rotated in a clockwise direction (again, as viewed from the top in the various figures) to cause the spur gear 100A/100B to move the hollow sleeve 140 radially inwardly back to the position shown in FIGS. 7,8 and 9. Once this has been accomplished, the saw can be removed by lifting it vertically out of the pipe; and the cutoff portion of the pipe 160 then can be removed.

The internal pipe cutter described above in conjunction with the embodiment shown in FIGS. 1 through 11 provides a relatively stress free operation for the operator utilizing the pipe cutter; and by means of the centering housing facilitates accurate placement of the pipe cutter within the pipe and maintains the desired relationship between the offset position of the saw blade 144 and the centering housing 50/70 throughout the duration of the cut being made.

The foregoing description of an embodiment of the invention is to be considered as illustrative and not as limiting. Various changes and modifications will occur to those skilled in the art to achieve substantially the same result, in substantially the same way without departing from the true scope of the invention as defined in the appended claims.

What is claimed is:

1. A pipe cutter for cutting a pipe from the inside through insertion of the pipe cutter through an open end of the pipe, the pipe cutter including in combination: an elongated shaft having first and second ends, with the first end adapted for connection to a source of rotational power; a pipe pressing housing located between the first and second ends of the elongated shaft and having a diameter less than the diameter of the inside of a pipe to be cut; a rotary saw blade connected to the second end of the elongated shaft; and a mechanism in the centering housing coupling the shaft and the housing to move the shaft from an initial position with the saw blade out of contact with the pipe radially outwardly in the centering housing to cause the saw blade to engage and cut the pipe; wherein the mechanism coupling the shaft and the pressing housing operates to move the shaft to become parallel to the central axis of the pipe, Further including an elongated hollow sleeve having first and second ends and having a length less than the length of the elongated shaft, where the elongated shaft extends through the hollow sleeve for free rotation therein, and wherein the pipe pressing housing is coupled with the hollow sleeve adjacent the second end thereof, with the second end of the elongated shaft extending beyond the second end of the hollow sleeve.

2. A pipe cutter according to claim 1 wherein the mechanism in the pressing housing comprises a rack gear attached to the centering housing and a spur gear attached to the hollow sleeve and engaging the rack gear.

3. A pipe cutter according to claim 2 wherein the rack gear attached to the housing extends parallel to a radius of a pipe when the pipe cutter is inserted into the pipe.

4. A pipe cutter according to claim 3 further including a guide flange slidably mounted between the first end of the hollow sleeve and the centering housing for releasable attachment to the guide sleeve at different positions along the length thereof, with the guide flange projecting radially outwardly from the hollow sleeve a distance equal to or greater than the external diameter of a pipe to be cut and adapted to abut the open end of the pipe as the saw blade is circled within the pipe to cut the pipe.

5. A pipe cutter according to claim 4 wherein the spur gear is secured to the hollow sleeve for rotation therewith to move the hollow sleeve radially back-and-forth in the pipe centering housing.

6. A pipe cutter according to claim 5 wherein the pipe centering housing is a circular housing with an elongated slot therein extending radially to accommodate movement of the elongated hollow sleeve from an initial central position radially outward to a predetermined distance and back again.

7. A pipe cutter according to claim 1 wherein the elongated hollow sleeve is reciprocally radially mounted in the centering housing for limited radial movement therein.

8. A pipe cutter for cutting a pipe from the inside through insertion of the pipe cutter through an open end of the pipe, the pipe cutter including in combination: an elongated shaft having first and second ends, with the first end adapted for connection to a source of rotational power; a pipe pressing housing located between the first and second ends of the elongated shaft and having a diameter less than the diameter of the inside of a pipe to be cut; a rotary saw blade connected to the second end of the elongated shaft; and a mechanism in the pressing housing coupling the shaft and the housing to move the shaft from an initial position with the saw blade out of contact with the pipe radially outwardly in the pressing housing to cause the saw blade to engage and cut the pipe, further including an elongated hollow sleeve having first and second ends and having a length less than the length of the elongated shaft, where the elongated shaft extends through the hollow sleeve for free rotation therein, and wherein the pipe centering housing is coupled with the hollow sleeve adjacent the second end thereof, with the second end of the elongated shaft extending beyond the second end of the hollow sleeve.

9. A pipe cutter according to claim 8 further including a guide flange slidably mounted between the first end of the hollow sleeve and the centering housing for releasable attachment to the guide sleeve at different positions along the length thereof, with the guide flange projecting radially outwardly from the hollow sleeve a distance equal to or greater than the external diameter of a pipe to be cut and adapted to abut the open end of the pipe as the saw blade is circled within the pipe to cut the pipe.

10. A pipe cutter according to claim 8 wherein the mechanism in the centering housing comprises a rack gear attached to the centering housing and a spur gear attached to the hollow sleeve and engaging the rack gear.

11. A pipe cutter according to claim 10 wherein the rack gear attached to the housing extends parallel to a radius of a pipe when the pipe cutter is inserted into the pipe.

12. A pipe cutter according to claim 11 wherein the spur gear is secured to the hollow sleeve for rotation therewith to move the hollow sleeve radially back-and-forth in the pipe centering housing.

13. A pipe cutter according to claim 12 wherein the elongated hollow sleeve is reciprocally radially mounted in the centering housing for limited radial movement therein.

14. A pipe cutter according to claim 13 wherein the pipe centering housing is a circular housing with an elongated slot therein extending radially to accommodate movement of the elongated hollow sleeve from an initial central position radially outward to a predetermined distance and back again.

15. A pipe cutter according to claim 8 wherein the pipe centering housing is a circular housing with an elongated slot therein extending radially to accommodate movement of the elongated hollow sleeve from an initial central position radially outward to a predetermined distance and back again.

16. A pipe cutter for use in cutting a pipe from the inside by insertion of the pipe cutter through an open end of the pipe, the cutter including in combination: an elongated hollow sleeve having a predetermined length and having first and second ends; an elongated shaft rotatably mounted inside the hollow sleeve with a length greater than the predetermined length and having first and second ends extending beyond the first and second ends, respectively, of the hollow sleeve, with the first end of the elongated shaft adapted for connection to a source of rotational power; a centering housing located between the first and second ends of the hollow sleeve and having a diameter less than the diameter of the inside of a pipe to be cut; a rotary saw blade connected to the second end of the elongated shaft wherein the pressing housing includes a mechanism to cause the hollow sleeve to move from an initial position with the saw blade out of contact with the pipe to a position radially outward from the central axis of the pipe to cause the saw blade to engage and cut the pipe.

17. A pipe cutter according to claim 16 further including a mechanism coupling the hollow sleeve and the centering housing, the mechanism including a rack gear attached to the centering housing and a spur gear attached to the hollow sleeve and engaging the rack gear, so that rotation of the hollow sleeve and the spur gear causes the hollow sleeve to move radially back-and-forth as the hollow sleeve is rotated in opposite directions.

18. A pipe cutter according to claim 17 further including a flat guide flange slidably mounted on the hollow sleeve between the first end thereof and the centering housing for releasable attachment to the hollow sleeve at different distances from the first end thereof for abutting the open end of a pipe to be cut to position the rotary saw blade at a desired distance from the open end of the pipe.

19. A pipe cutter according to claim 18 wherein the limits of the radial movement of the hollow sleeve relative the centering housing is established by an elongated slot in the centering housing through which the hollow sleeve extends.

* * * * *